United States Patent
Ooyama

(10) Patent No.: US 6,520,884 B2
(45) Date of Patent: Feb. 18, 2003

(54) TORQUE-SPLIT TYPE CONTINUOUSLY VARIABLE TRANSMISSION

(75) Inventor: Kazuo Ooyama, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 26 days.

(21) Appl. No.: 09/813,981

(22) Filed: Mar. 22, 2001

(65) Prior Publication Data

US 2001/0024987 A1 Sep. 27, 2001

(30) Foreign Application Priority Data

Mar. 27, 2000 (JP) .......................... 2000-085742

(51) Int. Cl.$^7$ ............................... F16H 37/02
(52) U.S. Cl. ....................................... 475/216
(58) Field of Search ................... 475/216, 214, 475/215

(56) References Cited

U.S. PATENT DOCUMENTS

| | | | | |
|---|---|---|---|---|
| 5,230,670 A | * | 7/1993 | Hibi ........................... | 475/214 |
| 5,238,460 A | * | 8/1993 | Esaki et al. ................. | 475/192 |
| 5,564,998 A | * | 10/1996 | Fellows ....................... | 475/216 |
| 5,888,160 A | * | 3/1999 | Miyata et al. ............... | 475/216 |
| 6,063,002 A | * | 5/2000 | Nobumoto et al. ........... | 477/41 |
| 6,217,473 B1 | * | 4/2001 | Ueda et al. .................. | 475/216 |
| 6,251,038 B1 | * | 6/2001 | Ishikawa et al. ............ | 475/216 |
| 6,254,504 B1 | * | 7/2001 | Goi et al. .................... | 475/216 |
| 6,283,888 B1 | * | 9/2001 | Hirano ........................ | 475/216 |
| 6,302,819 B1 | * | 10/2001 | Yamada et al. ............. | 475/214 |
| 6,306,059 B1 | * | 10/2001 | Yamada ....................... | 475/214 |
| 6,358,179 B1 | * | 3/2002 | Sakai et al. ................. | 475/216 |

FOREIGN PATENT DOCUMENTS

| | | |
|---|---|---|
| JP | 10-196759 | 7/1998 |
| JP | 11-236955 | 8/1999 |

* cited by examiner

Primary Examiner—Christopher P. Schwartz
Assistant Examiner—Devon Kramer
(74) Attorney, Agent, or Firm—Armstrong, Westerman & Hattori, LLP

(57) ABSTRACT

A toroidal type continuously variable transmission mechanism is mounted on a transmission input shaft coaxially therewith and joined thereto, and a first power transmission mechanism is provided between the input shaft and a transmission countershaft. A single-pinion type planetary gear mechanism is mounted on a transmission output shaft coaxially therewith, and a second power transmission mechanism is provided between driven discs of the continuously variable transmission mechanism and planetary gear mechanism. A torque-split clutch for engaging and disengaging a carrier of the planetary gear mechanism and countershaft with and from each other, a reversing brake for fixedly holding the carrier, and a starting clutch for engaging and disengaging a sun gear and output shaft with and from each other. A driving gear, which is held firmly between the driven discs, and a driven gear form the second power transmission mechanism, and a ring gear is joined to the output shaft.

6 Claims, 15 Drawing Sheets

TORQUE-SPLIT TYPE CONTINUOUSLY VARIABLE TRANSMISSION

FIELD OF THE INVENTION

This invention relates to a toroidal type continuously variable transmission (CVT) formed by using a toroidal mechanism, and more particularly to a torque-split type continuously variable transmission formed by combining together a toroidal type continuously variable transmission mechanism, a planetary gear mechanism and clutches.

BACKGROUND OF THE INVENTION

A toroidal type continuously variable transmission using a toroidal transmission unit formed by providing in a cavity, which is formed between input and driven discs disposed in a mutually opposed state, with power rollers so that the power rollers are engaged with and held between these disks has already been known. A double-cavity toroidal type continuously variable transmission formed by arranging such toroidal transmission units in parallel with each other in the axial direction, connecting both of driving discs of the two sets of toroidal transmission units to an input member, and connecting both of driven discs thereof to an output member has also already been known.

A torque-split type continuously variable transmission formed by combining a torque-split mechanism with a toroidal type continuously variable transmission mechanism, and adapted to transmit an engine output wholly to the continuously variable transmission mechanism when the obtainment of a high reduction gear ratio is desired, and use a planetary mechanism-carrying torque-split mechanism when the obtainment of a low reduction gear ratio is allowed. The related art torque-split type continuously variable transmissions include torque-split type continuously variable transmissions disclosed in Japanese Patent Laid-Open Nos. 196759/1998 and 236955/1999.

In the torque-split continuously variable transmission disclosed in Japanese Patent Laid-Open No. 196759/1998 mentioned above, a starting clutch is mounted on an input shaft. When the starting clutch is disengaged with a vehicle stopped, the rotation of the toroidal type continuously variable transmission mechanism is stopped, and a speed changing operation cannot be carried out. In the case of the torque-split type continuously variable transmission disclosed in Japanese Patent Laid-Open No. 236955/1999 mentioned above, a clutch is provided closer to an output shaft than to a toroidal type continuously variable transmission mechanism, so that a speed changing operation can be carried out even when a vehicle is stopped. Therefore, this continuously variable transmission has an excellent speed change controllability.

Both of these torque-split type continuously variable transmissions are formed by using a single cavity type toroidal continuously variable transmission mechanism made by using a single toroidal transmission unit, and the construction of these transmissions is therefore comparatively simple. However, in the case of a double-cavity type toroidal continuously variable transmission formed by using a pair of toroidal transmission units, the number of the toroidal transmission units increases double to cause the construction of the transmission to become liable to be complicated. Especially, when a torque-split type continuously variable transmission is formed by using a double-cavity type toroidal continuously variable transmission mechanism, the construction of the transmission becomes liable to be complicated.

SUMMARY OF THE INVENTION

The invention has been made in view of the above-mentioned circumstances, and provides a torque-split type continuously variable transmission capable of being formed simply and compactly to as great an extent as possible when the transmission is made by using a double-cavity type toroidal continuously variable transmission mechanism.

The invention also provides a torque-split type continuously variable transmission formed so that the transmission can carry out a speed change control operation in a range of a comparatively large change gear ratio with a high transfer efficiency retained.

According to an aspect of the invention, the torque-split type continuously variable transmission includes a toroidal type continuously variable transmission mechanism (for example, a toroidal type continuously variable transmission mechanism 10 in a mode of embodiment) mounted coaxially on and connected to an input shaft (for example, an input shaft 1 of the transmission in the mode of embodiment) adapted to receive a driving force from a driving power source, a first power transmission mechanism (for example, a first power transmission mechanism 20 in the mode of embodiment) adapted to carry out the transmission of a rotational force between this input shaft and a countershaft (for example, a countershaft 2 of the transmission in the mode of embodiment) provided so as to extend in parallel with the input shaft, an output shaft (for example, an output shaft 3 of the transmission in the mode of embodiment) provided so as to extend in parallel with the input shaft and coaxially with the countershaft, a single pinion type planetary gear mechanism (for example, planetary gears 50 mounted on this output shaft coaxially therewith, a second power transmission mechanism (for example, a second power transmission mechanism 30 in the mode of embodiment) adapted to carry out the transmission of a rotational force between output members (for example, driven discs 15a, 15b) in the mode of embodiment) of the toroidal type continuously variable transmission mechanism and single pinion type planetary gear mechanism, a torque split clutch device (for example, a torque split clutch 40 in the mode of embodiment) capable of engaging and disengaging a carrier member (for example, a carrier 52 in the mode of embodiment) of the single pinion type planetary gear mechanism and countershaft with and from each other, a reversing brake device (for example, a reversing brake 43 in the mode of embodiment) capable of fixedly holding the carrier member, and a starting clutch device (for example, a starting clutch 46 in the mode of embodiment) capable of engaging and disengaging a sun gear member (for example, a sun gear 51 in the mode of embodiment) of the single pinion type planetary gear mechanism and output shaft with and from each other, the toroidal type continuously variable transmission mechanism being formed of a double-cavity type toroidal continuously variable transmission mechanism in which a pair of driven discs (for example, the driven discs 15a, 15b in the mode of embodiment) are positioned in an adjacent side opposed state in an axially central portion of the toroidal type continuously variable transmission mechanism, both a driving gear (for example, a driving gear 31 in the mode of embodiment) held between and connected to these two driven discs and a driven gear (for example, a driven gear 32 in the mode of embodiment) meshed with the driving gear and joined to the sun gear member constituting a second power transmission mechanism, a ring gear member of the single pinion type planetary gear mechanism being joined to the output shaft.

According to the torque-split type continuously variable transmission of such a construction, an output from the toroidal type continuously variable transmission mechanism is transmitted from the driving gear held between a pair of driven discs provided in an adjacent side opposed state in an axially central portion of the double-cavity type toroidal continuously variable transmission mechanism to the sun gear member via the driven gear meshed with the driving gear. Therefore, the torque-split type continuously variable transmission uses the double-cavity type toroidal continuously variable transmission mechanism, and, moreover, can be formed simply and compactly as a whole. Especially, as is clearly understood from the construction of the embodiments, an inner space of the transmission is effectively utilized by providing the planetary gear mechanism between the first and second power transmission mechanisms, this enabling the transmission as a whole to be formed to small dimensions, i.e., compactly.

The torque-split type continuously variable transmission according to the invention can also be formed by using a double-pinion type planetary gear mechanism (for example, a planetary gear mechanism 150 in a mode of embodiment) instead of the single pinion type planetary gear mechanism in the above-mentioned structure. The transmission using the double pinion type planetary gear mechanism is formed by providing a torque split clutch device (for example, a torque-split clutch 40' in the mode of embodiment) capable of engaging and disengaging a ring gear member (for example, a ring gear 153 in the mode of embodiment) of the double-pinion type planetary gear mechanism and a countershaft (for example, a countershaft 1' of the transmission in the mode of embodiment) with and from each other, a reversing brake device (for example, a reversing brake 43' in the mode of embodiment) capable of fixedly holding the ring gear member, and a starting clutch device (for example, a starting clutch 46' in the mode of embodiment) capable of engaging and disengaging a sun gear member (for example, a sun gear 151 in the mode of embodiment) of the double-pinion type planetary mechanism and an output shaft (for example, an output shaft 3' of the transmission in the mode of embodiment) with and from each other, a carrier member of the double pinion type planetary gear mechanism being joined to the output shaft.

The torque-split type continuously variable transmission of the above-described construction is preferably formed as follows. Each of the driving gear and driven gear is formed by combining together two single helical gears (for example, driving gear elements 31a, 31b and driven gear elements 32a, 32a) the directions of distortion of which are symmetrical. Owing to a thrust which the driving gear meshed with the driven gear receives, the two single helical gears constituting the driving gear are pressed toward the side of the driven gear, while the two single helical gears constituting the driven gear are pressed in the direction in which the same helical gears are combined with each other.

Thus, a thrust exerted on the driving gear held under pressure between the two driven discs resists the disc holding force, and works in the driven gear so that the two helical gears press each other. As a result, the second power transmission mechanism using a double helical gear enables the transmission of rotation to be effected smoothly, and, moreover, the thrust exerted on the driving gear and the driven disc-holding force are offset each other. This enables the thrust exerted on the driven gear to work so as to combine together the left and right gears constituting the driven gear, the exertion of the thrust, which works on the driving and driven gears, on each of bolts by which the two single helical gears are combined with each other to be prevented, and the occurrence of a decrease in the combining force of the bolts to be avoided.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

Preferred embodiments of the present invention will be described in detail with reference to the following figures, wherein.

DESCRIPTION OF THE PREFERRED EMBODIMENTS

Figure 1:
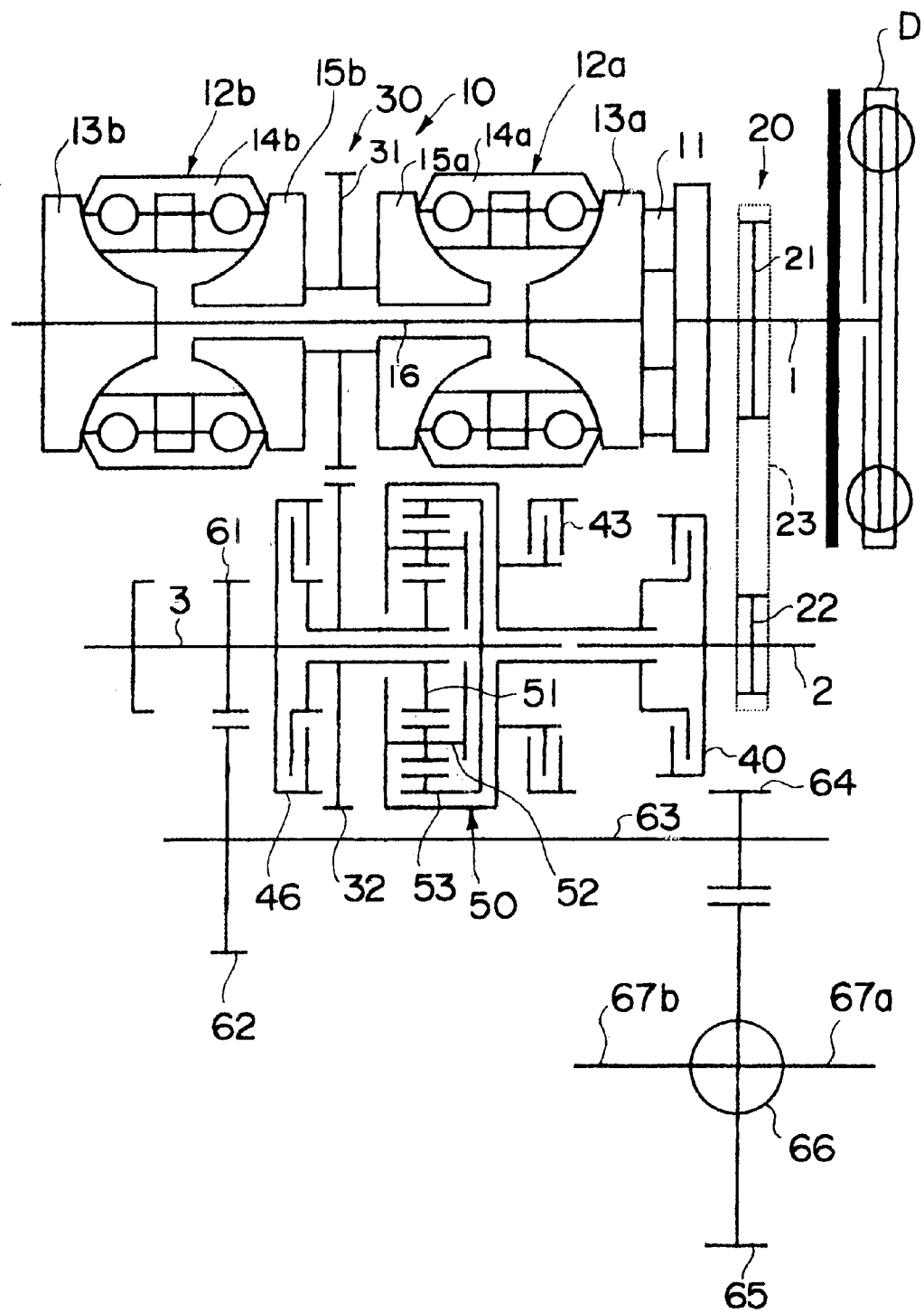
FIG. 1 is a schematic diagram showing the construction of a power transmission path of a first mode of embodiment of the torque-split type continuously variable transmission according to the invention.
Figure 2:
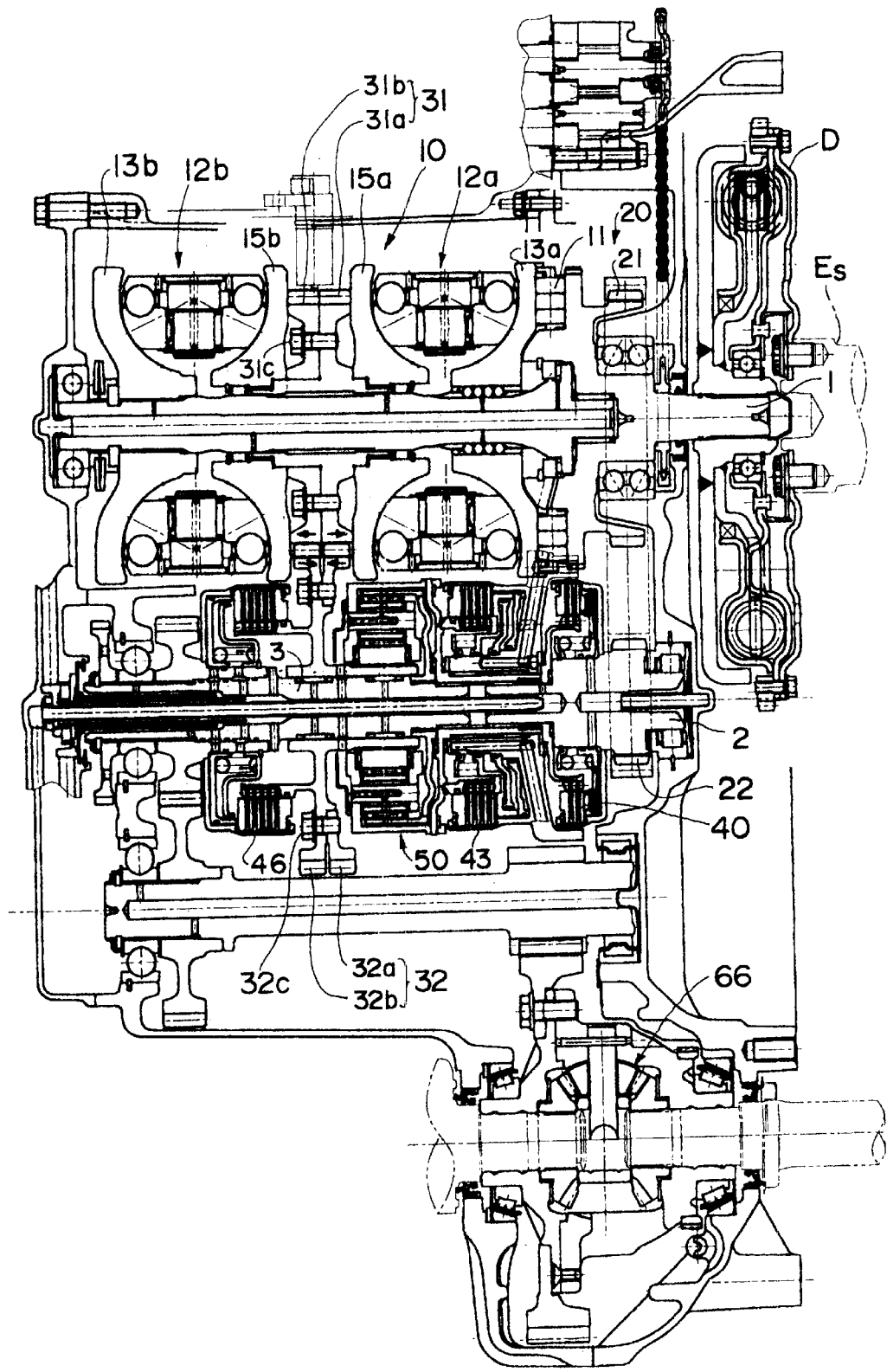
FIG. 2 is a sectional view showing the construction of the first mode of embodiment of the torque-split type continuously variable transmission according to the invention.

Preferred modes of embodiment of the invention will now be described with reference to the drawings.
First Mode of Embodiment The construction of the first mode of embodiment of the torque-split type continuously variable transmission according to the invention is shown in FIGS. 1 and 2. This continuously variable transmission is provided with an input shaft 1 connected to an output shaft Es of an engine via a damper mechanism D, and a double-cavity type toroidal continuously variable transmission mechanism 10 coaxially with this input shaft 1. The toroidal continuously variable transmission mechanism 10 includes a loading cam mechanism 11 connected to the transmission input shaft 1, and first and second toroidal transmission units 12a, 12b arranged in a symmetrically opposed state. The first and second toroidal transmission units include driving discs 13a, 13b, driven discs 15a, 15b, and power rollers 14a, 14b provided in spherical cavities surrounded by these driving and driven discs. The driving disc 13a is joined to the transmission input shaft 1 via the loading cam mechanism 11, and the driving discs 13a, 13b are combined together via a connecting shaft 16.

In the toroidal type continuously variable transmission mechanism 10 of such a construction, the controlling of the rolling of the power rollers 14a, 14b in the cavities enables the rotation of the driven discs 15a, 15b with respect to that of the driving discs 13a, 13b to be changed in a continuously variable manner, i.e., a continuously variable speed changing operation for the mentioned rotation to be carried out. Since this structure has heretofore been known, a further description of the toroidal type continuously variable transmission mechanism 10 will be omitted.

A transmission counter shaft 2 extending in parallel with the transmission input shaft 1 with a predetermined distance spaced therefrom, and a tramission output shaft 3 are coaxially provided. The input shaft 1 and countershaft 2 are connected together by a first power transmission mechanism 20 formed of a driving sprocket 21 mounted fixedly on the input shaft 1, a driven sprocket 22 mounted fixedly on the countershaft 2 and a chain 23 passed around these two sprockets 21, 22. Accordingly, the rotation of the input shaft 1 is transmitted with a predetermined change gear ratio to the countershaft 2 via the first power transmission mechanism 20.

On the output shaft 3, a planetary gear mechanism 50 is mounted coaxially therewith. This planetary gear mechanism is formed of a single planetary type gear train, which has a sun gear 51, a single pinion support carrier 52 and a ring gear 53. The sun gear 51 can be engaged via a starting clutch 46 with and disengaged from the output shaft 3, and the ring gear 53 is combined in a body with the output shaft 3. The carrier 52 can be engaged with and disengaged from the counter shaft 2 via a torque-split clutch 40, and held fixedly by a reversing brake 43.

Between the two driven discs 15a, 15b in the above-mentioned toroidal type continuously variable transmission mechanism 10, a driving gear 31 is provided in a firmly held state, and this driving gear 31 is connected to the two discs 15a, 15b. The driving gear 31 is meshed with a driven gear 32 joined to the sun gear 51 of the planetary gear mechanism 50 and mounted on the output shaft 3. These driving and driven gears 31, 32 constitute a second power transmission mechanism 30 adapted to transmit output rotation of the driven discs 15a, 15b of the continuously variable transmission mechanism 10 to the sun gear 51 of the planetary gear mechanism 50.

As shown in FIG. 2, the driving gear 31 is formed by combining two gear elements 31a, 31b with each other by a bolt 31c, and also the driven gear 32 by combining two gear elements 32a, 32b with each other by a bolt 32c. The driving gear elements 31a, 31b are formed of single helical gears the directions of distortion of which are symmetrical, and combined together by the bolt 31c to form the driving gear 31 made of one double helical gear. Similarly, the driven gear elements 32a, 32b are also formed of single helical gears the directions of distortion of which are symmetrical, and combined together by the bolt 32c to form the driven gear 32 made of one double helical gear. This enables double helical gears (herringbone gears) to be manufactured easily.

When the driving gear 31 and driven gear 32 formed of such double helical gears are meshed with each other, a thrust corresponding to a helix angle of the helical gears is exerted on each of the gear element 31a, 31b. The thrust occurring at this time works in the driving gear 31 in the directions (directions designated by arrows in FIG. 2) in which the driving gear elements 31a, 31b are forcibly separated from each other, and in the driven gear 32 in the directions (directions designated by arrows in FIG. 2) in which the driven gear elements 32a, 32b are combined with each other.

In this embodiment, the driving gear 31 is held between the driven discs 15a, 15b positioned on the left and right sides thereof, and the thrust exerted on the driving gear elements 31a, 31b is received by the driven discs 15a, 15b. The driven discs 15a, 15b receive a holding force, which corresponds to driving torque, from a loading cam mechanism 11, and holds the driving gear 31 therebetween, and the thrust exerted on the driving gear elements 31a, 31b is caught reliably owing to the driving gear holding force. Therefore, the influence of the thrust is rarely exerted on the bolt 31c, and there is not the possibility that the bolt 31c reduces the level of the force for combining the driving gear elements 31a, 31b together. The thrust exerted on the driven gear elements 32a, 32b works in the direction in which these driven gear elements 32a, 32b are combined with each other, i.e., in the direction identical with the direction in which the combining force of the bolt 32c is exerted. Therefore, there is not the possibility that the combining force of the driven gear elements 32a, 32b produced by the combining bolt 32c decreases.

A first output gear 61 is mounted fixedly on the transmission output shaft 3, and meshed with a second output shaft 62 mounted fixedly on a secondary shaft 63.

The secondary shaft 63 is also mounted fixedly with a third output gear 64, which is meshed with a fourth output gear 65 having a differential mechanism 66. Accordingly, a rotation of the output shaft 3 is transmitted to left and right axles 67a, 67b via the first to fourth output gears 61, 62, 64, 65, secondary shaft 63 and differential mechanism 66, and then to left and right wheels.

The operation of the torque-split type continuously variable transmission thus constructed will now be described. First, a case where a vehicle in a stopped condition is started forward and made to travel will be described. When a vehicle is in a stopped condition, an engine is usually in an idling state, and the torque-split clutch 40, reversing brake 43 and starting clutch 46 are disengaged. In this condition, a rotational driving force of the engine is transmitted from the transmission input shaft 1 to the toroidal type continuously variable transmission mechanism 10 to rotate the driving discs 13a, 13b. The speed of rotations of the driving discs 13a, 13b is changed in accordance with an actual rolling angle of the power rollers 14a, 14b to rotate the driven discs 15a, 15b. Therefore, even when the vehicle is in a stopped condition, a change gear ratio can be set variably to an arbitrary level by controlling the rolling angle of the power rollers 14a, 14b. When the vehicle is stopped with the engine in an idling state, a maximum reduction gear ratio R(idling) of the toroidal transmission units 12a, 12b is set to 2.408.

In the above-mentioned condition, the rotational driving force of the engine causes the sun gear 51 of the planetary gear mechanism 50 to be rotated via the toroidal type continuously variable transmission mechanism 10 and second power transmission mechanism 30, and the transmission countershaft 2 to be rotated via the first power transmission mechanism 20. Since the torque-split clutch 40, reversing brake 43 and starting clutch 46 are disengaged, the racing thereof occurs, so that the rotational driving force is not transmitted to the output shaft 3.

In order to start the vehicle in this condition, a driver steps on an accelerator to increase a rotational frequency of the engine. In response to this operation, a control operation for engaging the starting clutch 46 is carried but, and the rotational driving force of the engine is transmitted from the toroidal type continuously variable transmission mechanism 10 to the second power transmission mechanism 30, and further to the output shaft 3 via the starting clutch 46, so that the vehicle is started. When at this time the reduction gear ratio of the continuously variable transmission mechanism 10 is left at a maximum level R (idling)=2.408, there is the possibility that a contact surface pressure of the power rollers 14a, 14b and driving discs 13a, 13b becomes excessively high when the accelerator is stepped on to cause the engine torque to increase since the rolling angle of the power rollers 14a, 14b is large.

Therefore, a control operation for changing the reduction gear ratio of the continuously variable transmission mechanism 10 from a maximum level to a TOP side level in accordance with an accelerator stepping amount is carried out so as to prevent the contact surface pressure of the power roller 14a, 14b, driving discs 13a, 13b and driven discs 15a, 15b from becoming excessively high. For example, in order to start the vehicle with the accelerator fully opened, the reduction gear ratio is changed to a LOW ratio R(LOW)= 1.605 at which a maximum torque of the engine can be allowed when the starting clutch 46 is engaged. When the reduction gear ratio thus becomes low, the rolling angle of the power rollers 14a, 14b becomes small, and a contact radius of the driving discs 13a, 13b increases to a level 1.38 times as high as that in a case where a reduction gear ratio is at a maximum level. Accordingly, the contact surface pressure lowers greatly, and large input torque becomes able to be allowed.

Figure 6:
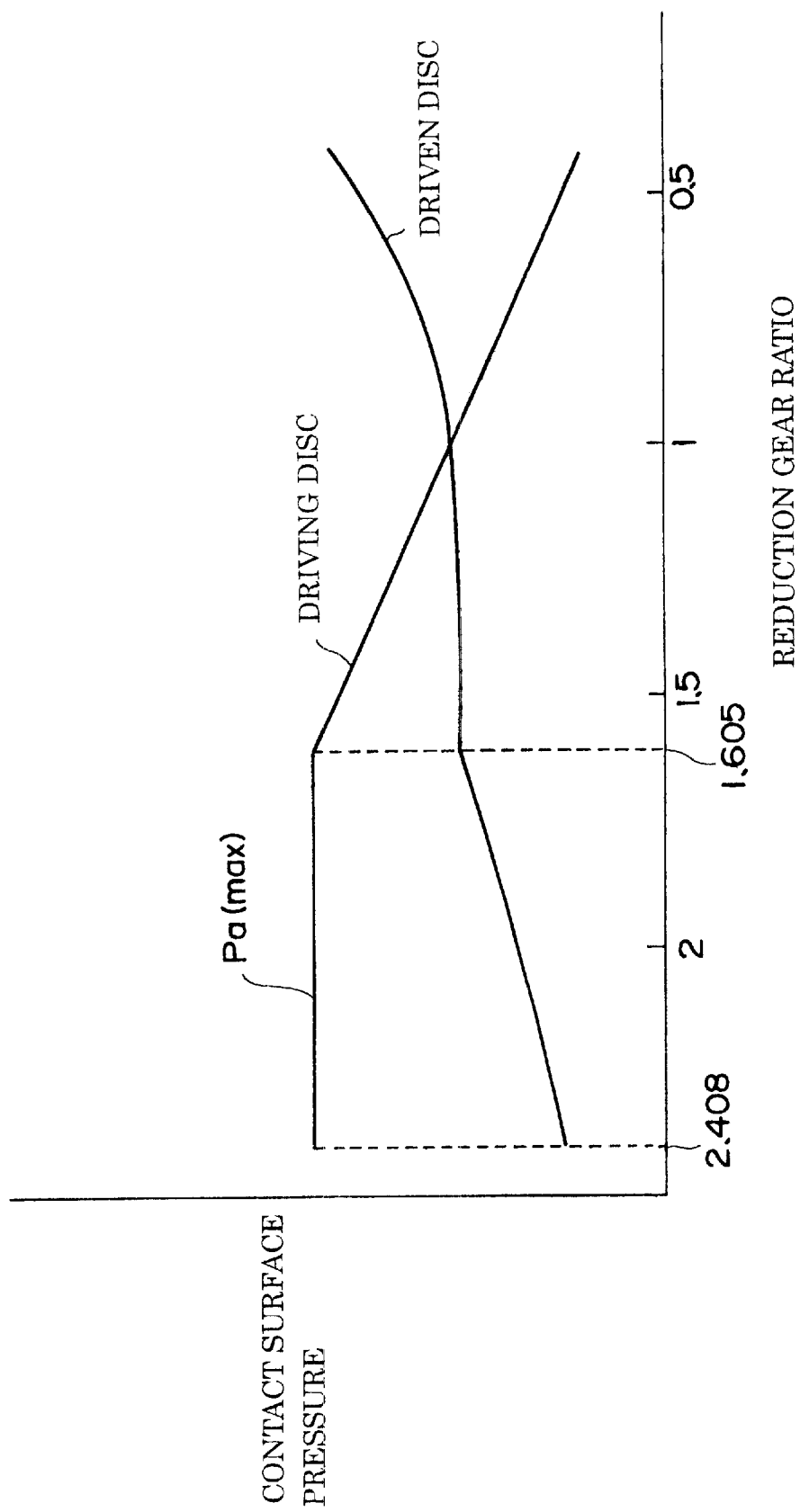
FIG. 6 is a graph showing the relation between a reduction ratio and a contact surface pressure of driving and driven discs at a speed changing time in the first mode of embodiment of the torque-split type continuously variable transmission according to the invention.

The variation of contact surface pressure during this time is shown in FIG. 6. A speed change control operation is carried out so that the contact surface pressure of the driving discs 13a, 13b attains a maximum allowable level Pa(max) when a reduction gear ratio is from a maximum level R(idling)=2.408 set when the engine is in an idling state to a level of LOW ratio R(LOW)=1.605. The surface pressure of the driven discs 15a, 15b becomes not higher than an allowable level during this time.

Figure 3:
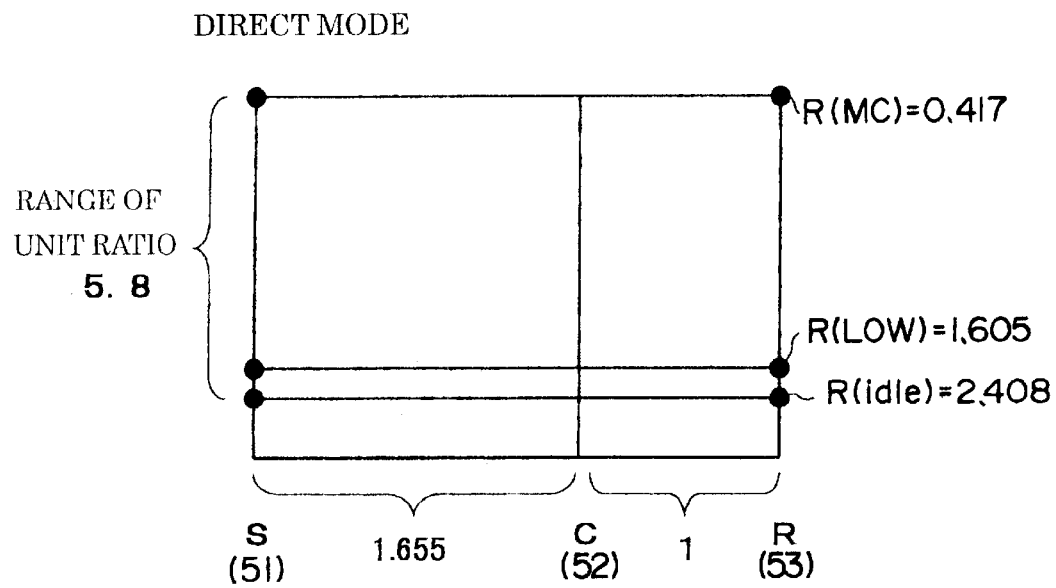
FIG. 3 is a speed diagram showing the content of a speed changing operation in a direct mode in the first mode of embodiment of the torque-split type continuously variable transmission according to the invention.

In the condition in which the starting clutch 46 is thus engaged, the sun gear 51 and ring gear 53 of the planetary gear mechanism 50 are put in a connected state with respect to the transmission output shaft 3, and the planetary gear mechanism 50 as a whole is rotated with the output shaft 3. The condition during this time is called a direct mode, and the rotational condition of the planetary gear mechanism 50 (and the output shaft 3) in this mode is shown in the speed diagram of FIG. 3. The planetary gear mechanism 50 is formed of a single planetary type gear train, in which a number of teeth ratio of the sun gear 51 to the ring gear is set to 1:1.655. Therefore, in the speed diagram, a distance between the sun gear 51 shown by a reference letter S and carrier 52 shown by a reference letter C, and that between the carrier 52 and ring gear 53 shown by a reference letter R are set correspondingly to inverse numbers of the above number of teeth ratio.

In the direct mode, the planetary gear mechanism 50 as a whole is rotated as one body. Accordingly, when the engine is in an idling condition with the vehicle stopped, a reduction gear ratio R(idling) of the continuously variable transmission mechanism 10 is 2.408 at highest. When the starting clutch is engaged by stepping on the accelerator up to a fully opened extent, the speed is changed to a level corresponding to a reduction gear ratio R(LOW)=1.605. As the vehicle speed thereafter increases, the speed is changed to a level corresponding to a minimum reduction gear ratio. At this point in time, the reduction gear ratio becomes R(MC)=0.417, and a control operation for transferring the mode to a torque-split mode is started. The variation of the contact surface pressure of the driving and driven discs 13, 15 and power roller 14 of the continuously variable transmission mechanism 10 during the time of a speed changing operation in a direct mode of a reduction gear ratio of 2.408–0.417 is shown in FIG. 6.

The transferring of the actual mode to a torque-split mode is done by first engaging the torque-split clutch 40 with the reduction gear ratio of the continuously variable transmission mechanism 10 left at R(MC)=0.417. In order to render this engagement possible, a reduction gear ratio of the first power transmission mechanism 20 formed of a chain mechanism is set to R(MC)=0.417. The starting clutch 46 is then disengaged. As a result, the torque transmission path is switched, and an engine output is transmitted to the carrier 52 of the planetary gear mechanism 50 via the first power transmission mechanism 20 and torque-split clutch 40. Since the ring gear 53 is combined with the transmission output shaft 3 at this time, the rotation of the ring gear 53 is transmitted to the wheels to drive the same, and the reaction torque is exerted on the ring gear 53 in the ring gear stopping direction. The rotational torque receiving the torque exerted on the carrier 52 and ring gear 53 and working on the sun gear 51 is received by the toroidal type continuously variable transmission mechanism 10.

Figure 4:
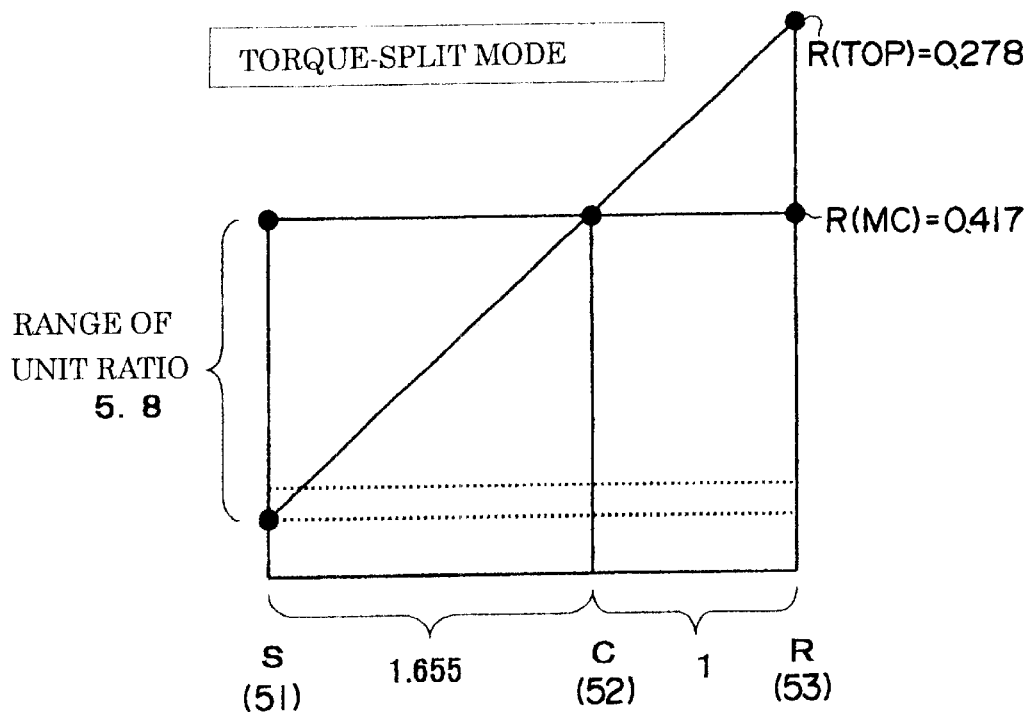
FIG. 4 is a speed diagram showing the content of a speed changing operation in a torque-split mode in the first mode of embodiment of the torque-split type continuously variable transmission according to the invention.

Therefore, when a control operation for, conversely at this time, increasing the reduction gear ratio of the continuously variable transmission mechanism 10 from a minimum level of 0.417 with the rotational frequency of the engine assumed to be constant, the rotational frequency of the sun gear 51 lowers and that (i.e. the rotational frequency of the transmission output shaft 3) of the ring gear 53 increases with the rotational frequency of the carrier kept constant. When the reduction gear ratio of the continuously variable transmission mechanism 10 is changed to a maximum level of 2.408, a reduction gear ratio of the portion which is from the input shaft 1 to the output shaft 3 is changed from R(MC)=0.417 to R(TOP)=0.278 as shown in FIG. 4.

As is understood from the above description, a range of reduction gear ratio of the continuously variable transmission mechanism 10 alone is from 2.408 to 0.417, i.e. the width of the range is 5.8. This range can be utilized as it is in a direct mode. In a torque-split mode, the range can be extended to 0.278 by utilizing the planetary gear mechanism 50, and a total range of reduction gear ratio becomes about 8.66. Therefore, it becomes possible to compensate for a lack of input torque from the engine by utilizing such a wide ratio range and setting high the vehicle starting torque or creep torque. When the input torque from the engine is sufficiently high, the power performance of the vehicle can be improved by using the large ratio width.

A case of reversing travel of a vehicle will now be described. In this case, the reversing brake 43 is engaged to set a reversing mode (Rev mode). When the reversing brake 43 is engaged, the carrier 52 of the planetary gear mechanism 50 is fixedly held. The rotation of the engine is transmitted from the continuously variable transmission mechanism 10 to the sun gear 51 via the second power transmission mechanism 30 to cause the sun gear to rotate, so that the ring gear 53 is rotated backward. The reduction gear ratio at this time becomes 1/1.655 which corresponds to a number of teeth ratio of the sun gear 51 to the ring gear 53.

Figure 5:
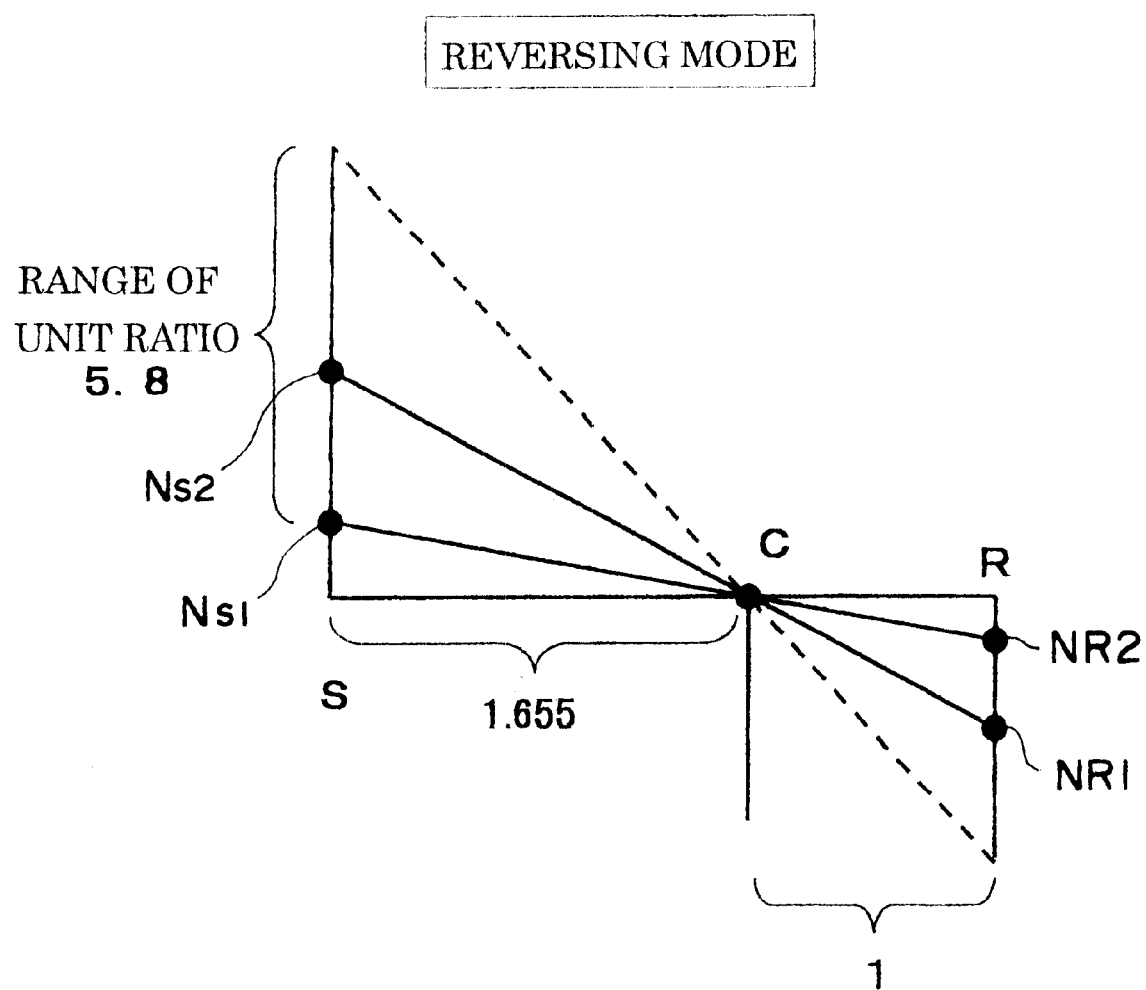
FIG. 5 is a speed diagram showing the content of a speed changing operation in a reversing mode in the first mode of the torque-split type continuously variable transmission according to the invention.

This condition is shown in FIG. 5. At the engine idling time, a reduction gear ratio of the continuously variable transmission mechanism 10 is set to a maximum level of 2.408, and the sun gear 51 is put in a rotating condition shown by a reference symbol NS1, and the ring gear 53 (and the transmission output shaft 3) a rotating condition shown by a reference symbol NR1. When the accelerator is stepped on, the rotational frequency of the engine increases, and a change gear ratio of the continuously variable transmission mechanism 10 is changed to a forward side LOW ratio R(LOW)=1.605 in accordance with the increase in the rotational frequency of the engine in the same manner as in the case where the vehicle travels forward. Consequently, the sun gear 51 is put in a rotating condition shown by a reference symbol NS2, and the ring gear 53 (and the output shaft 3) a rotating condition shown by a reference symbol NR2. A speed change control operation during backward travel of the vehicle is carried out until the reduction gear ratio attains R(LOW)=1.605, and a control operation for further reducing the reduction gear ratio is not carried out.

Figure 7:
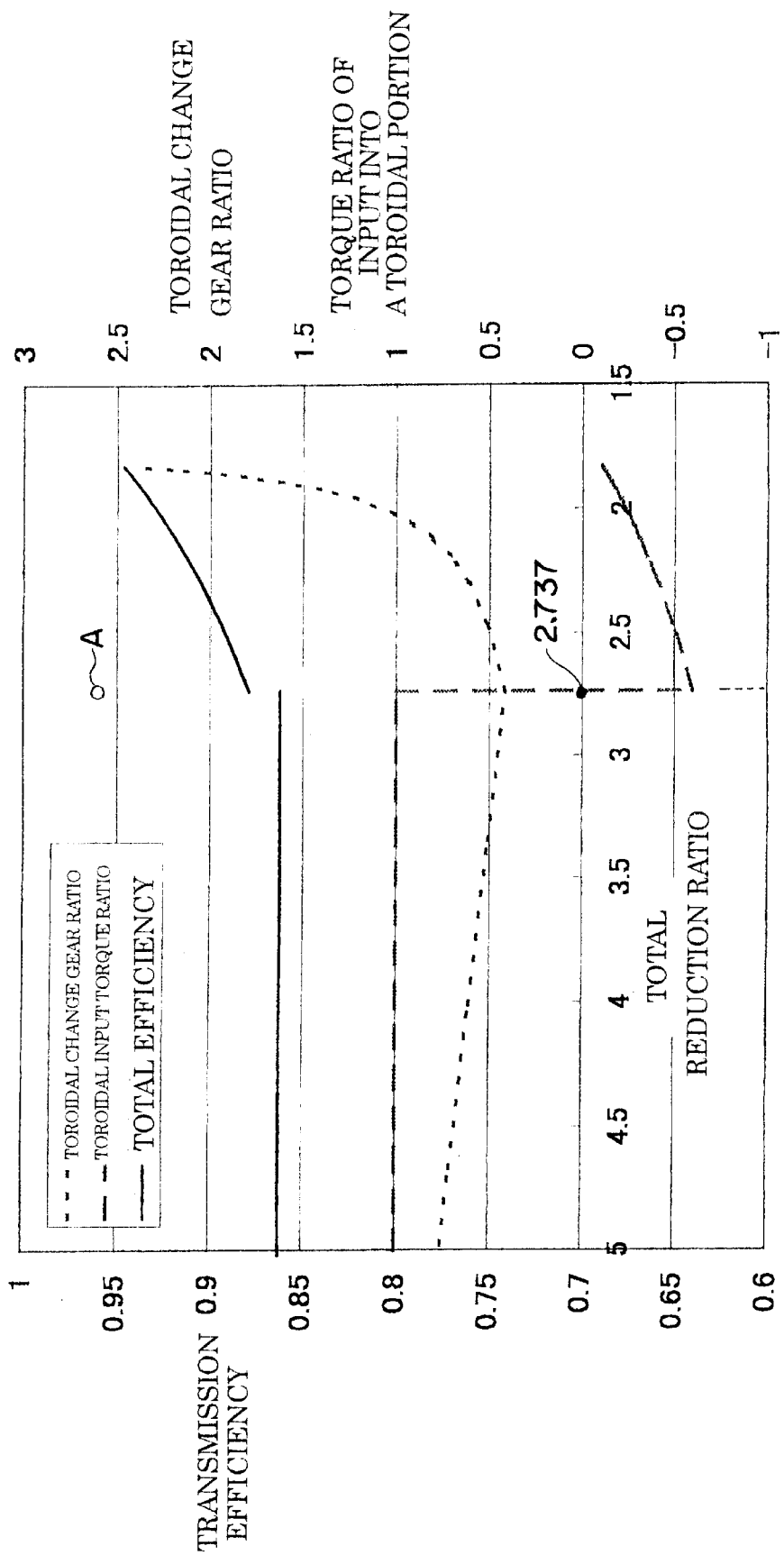
FIG. 7 is a graph showing the relation between a total reduction ratio and a change gear ratio of a toroidal type continuously variable transmission mechanism and between a torque ratio and a total efficiency at a speed changing time in the first mode of embodiment of the torque-split type continuously variable transmission according to the invention.

The efficiency obtained when a forward travel speed change control operation is carried out as mentioned above in a direct mode and a torque-split mode will now be described with reference to FIG. 7. This drawing shows the relation between a total reduction gear ratio (a reduction gear ratio of the portion which is from the transmission input shaft 1 to the fourth output gear 65 having a differential mechanism) of the torque-split type continuously variable transmission of the above-described construction and a power transmission efficiency. In this embodiment, calculations are made with a transmission efficiency of the continuously variable transmission mechanism 10, an efficiency of a power transmission unit formed of gears and a chain, and a friction loss of an oil pump set to 90%, 98% and 2%, respectively.

In the case of this transmission, a total reduction gear ratio is set in a range of 15.877–1.825. A total reduction gear ratio of 15.877–2.737 constitutes a direct mode, and a total reduction gear ratio of 2.737–1.825 a torque-split mode. FIG. 7 shows a range of a total reduction gear ratio of not higher than 5. First, when a total reduction gear ratio is in the range (15.877–1.825) of not lower than 2.737, the actual mode turns into a direct mode, and a rotational force from the engine wholly passes through the continuously variable transmission mechanism 10, so that the efficiency becomes constant.

A point at which the total reduction gear ratio is 2.737 is a transition point at which a direct mode is switched to a torque-split mode, and at which the torque-split clutch 40 is engaged with the starting clutch 46 disengaged. In a torque-split mode, the power transmission is carried out via the first power transmission mechanism 20, so that the transmission efficiency increases. A sudden change of the level of the toroidal input torque ratio into a negative level indicates that the engagement of the torque-split clutch 40 and disengagement of the starting clutch 46 cause the direction in which the torque from the driven side in the planetary gear mechanism 50 to be reversed with torque working from the driven side on the continuously variable transmission mechanism 10. In a torque-split mode, an amount of energy passing through the transmission mechanism 10 decreases as the total reduction gear ratio comes closer to 1.825, and a total efficiency increases.

At a point of a total reduction gear ratio of 2.737, i.e. at a point at which the direct mode transfers to a torque-split mode, the torque-split clutch 40 can also be engaged with the starting clutch 46 kept engaged as mentioned above. In this condition, the transmitting of power can be done with torque not exerted on the continuously variable transmission mechanism 10 by removing a speed change control pressure applied to the power roller 14 of the transmission mechanism 10. In this condition, the engine torque is transmitted via the first power transmission mechanism 20, and a high transmission efficiency shown by a circle A in FIG. 7 is obtained.

Figure 8:
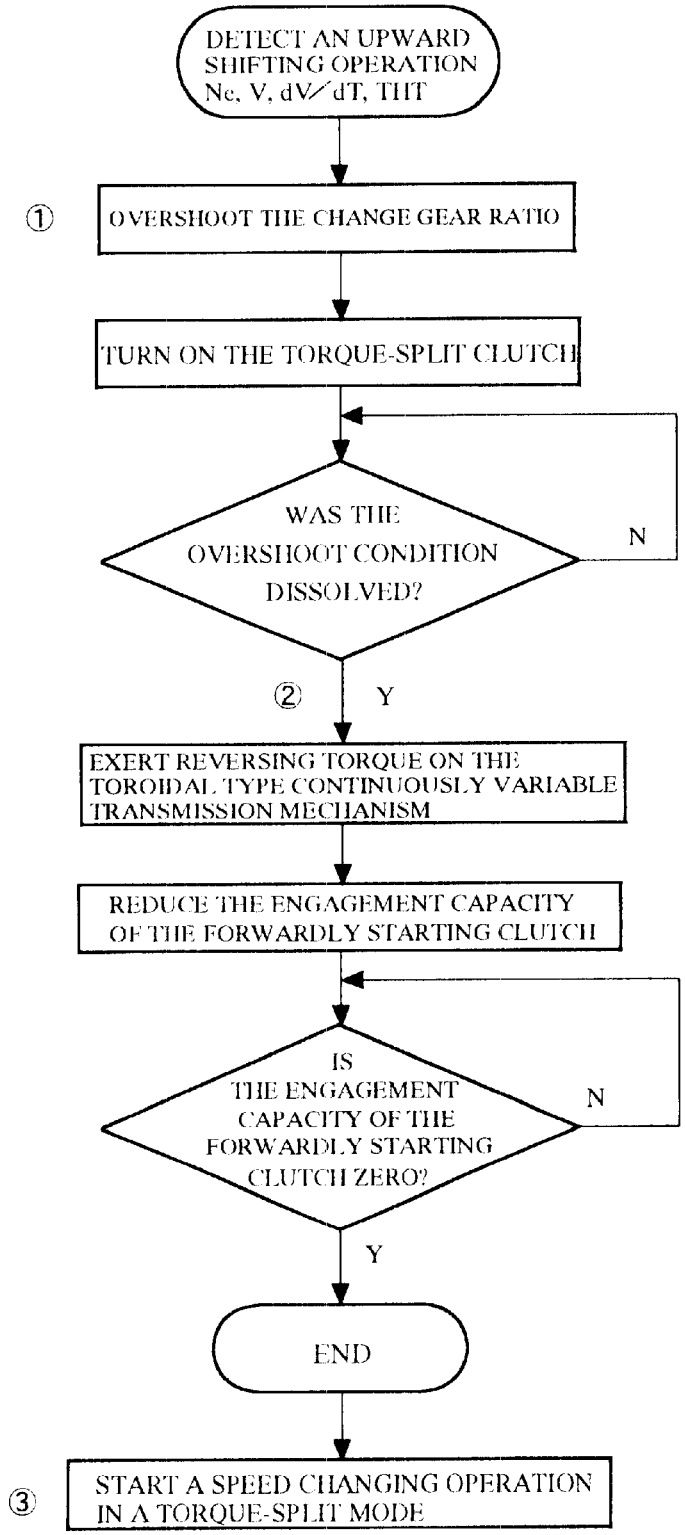
FIG. 8 is a flow chart showing an operation for controlling a transfer from a direct mode to a torque-split mode during the acceleration of an engine at a positive engine torque in the torque-split type continuously variable transmission according to the invention.
Figure 9:
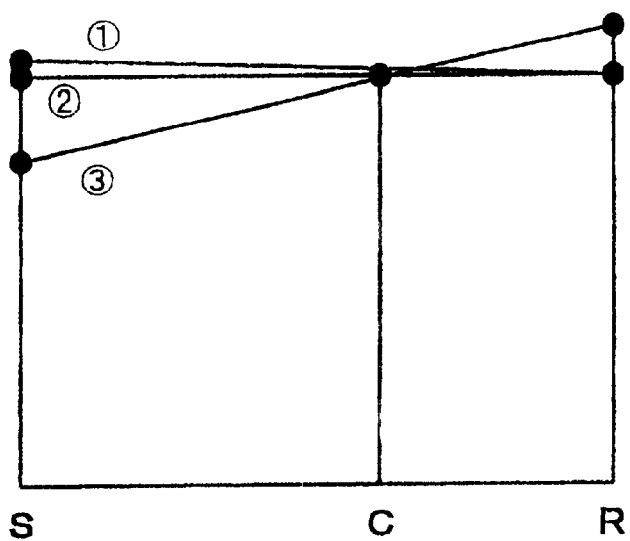
FIG. 9 is a speed diagram showing an operation for controlling a transfer from a direct mode to a torque-split mode during the acceleration of an engine at a positive engine torque in the torque-split type continuously variable transmission according to the invention.

The controlling of transfer from a direct mode to a torque-split mode and vice versa will now be described in detail. First, the controlling of a transfer from a direct mode to a torque-split mode in a case where the engine torque is accelerated positively, for example, in a case where a vehicle travels in an accelerated state on a flat road is shown in FIGS. 8 and 9. In this control operation, a change gear ratio is overshot at a transition point with the direct mode left unchanged, and the torque-split clutch 40 is engaged in this condition. When the overshot condition thereafter dissolves and changes into a condition in which reverse torque works on the continuously variable transmission mechanism 10, the starting clutch 46 is disengaged, and the mode is transferred to a torque-split mode.

Figure 11:
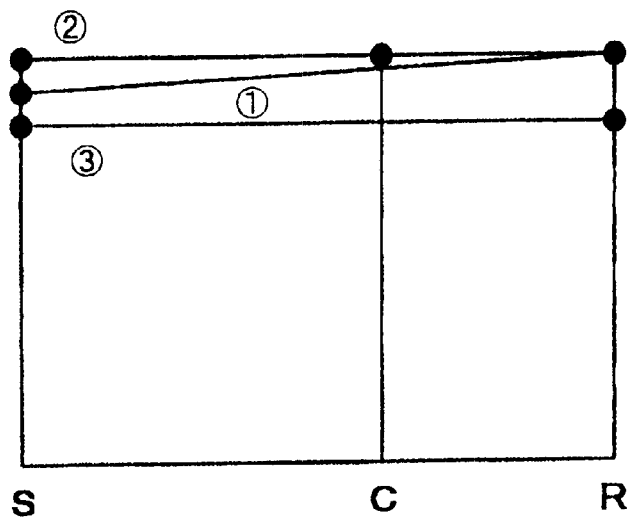
FIG. 11 is a speed diagram showing an operation for controlling a transfer from a torque-split mode to a direct mode during the deceleration of an engine at a negative engine torque in the torque-split type continuously variable transmission according to the invention.
Figure 10:
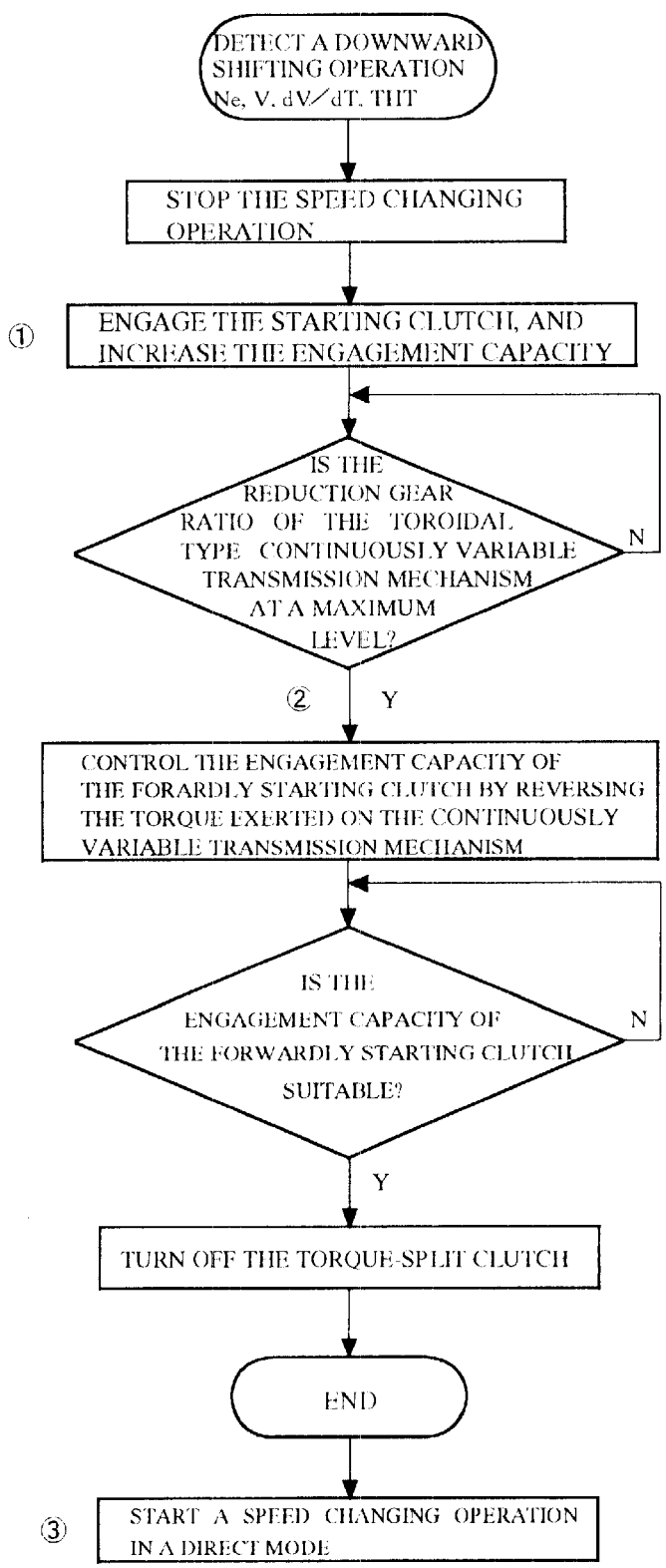
FIG. 10 is a flow chart showing an operation for controlling a transfer from a torque-split mode to a direct mode during the deceleration of an engine at a negative engine torque in the torque-split type continuously variable transmission according to the invention.

A control operation for transferring a torque-split mode to a direct mode in a case where a vehicle is decelerated with engine torque in a negative condition, for example, in a case where accelerator returning deceleration is carried out is shown in FIGS. 10 and 11. In this control operation, a speed changing operation is stopped at a point in the vicinity of a transition point in the torque-split mode, and the engaging of the starting clutch 46 is done to set a reduction gear ratio of the continuously variable transmission mechanism 10 to a minimum level. The engagement capacity of the starting clutch 46 is thereafter controlled with the torque exerted on the transmission mechanism 10 reversed. When the engagement capacity reaches a suitable level, the torque-split clutch 40 is disengaged to transfer the mode to a direct mode.

Figure 12:
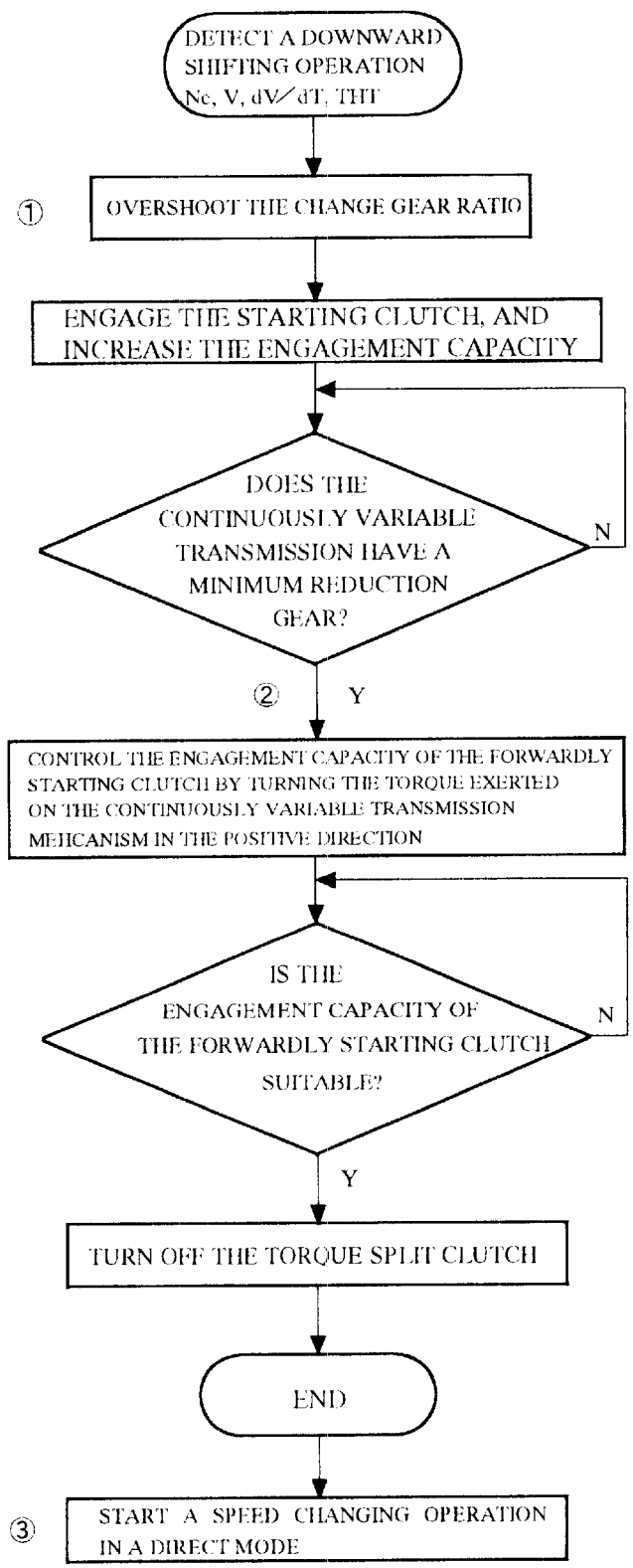
FIG. 12 is a flow chart showing an operation for controlling a transfer from a torque-split mode to a direct mode during the deceleration of an engine at a positive engine torque in the torque-split type continuously variable transmission according to the invention.
Figure 13:
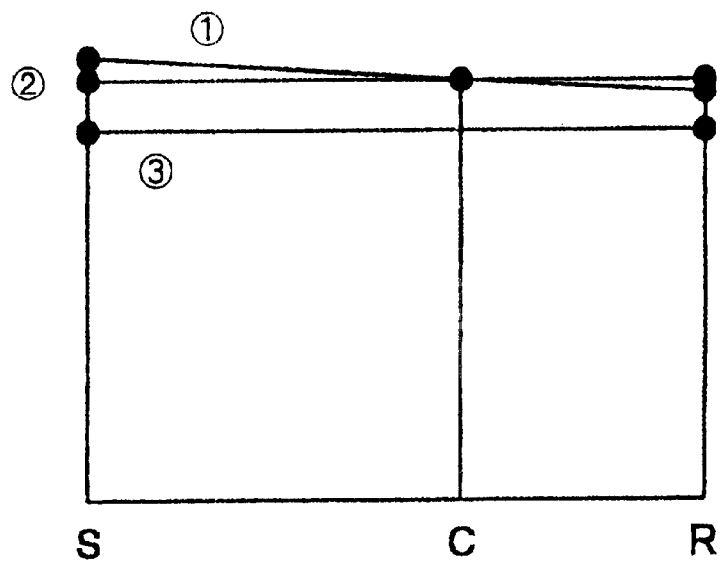
FIG. 13 is a speed diagram showing an operation for controlling a transfer from a torque-split mode to a direct mode during the deceleration of an engine at a positive engine torque in the torque-split type continuously variable transmission according to the invention.

The controlling of the transfer from a torque-split mode to a direct mode in a case where the vehicle is decelerated with the engine torque in a positive condition, for example, in a case where the vehicle runs up a slope is shown in FIGS. 12 and 13. In this control operation, a speed changing operation is stopped at a point in the vicinity of a transfer point in the torque-split mode, and the starting clutch 46 is engaged to set a reduction gear ratio of the transmission mechanism 10 to a minimum level. The engagement capacity of the starting clutch 46 is thereafter controlled with the torque exerted on the transmission mechanism 10 set in the positive direction. When the engagement capacity reaches a suitable level, the torque-split clutch 40 is disengaged, and the actual mode is transferred to the direct mode.

Figure 15:
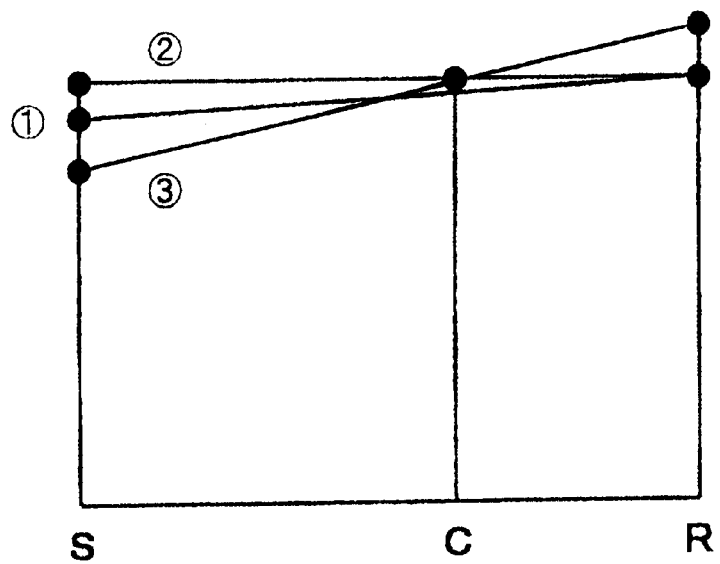
FIG. 15 is a speed diagram showing an operation for controlling a transfer from a direct mode to a torque-split mode during the acceleration of an engine at a negative engine torque in the torque-split type continuously variable transmission according to the invention.
Figure 14:
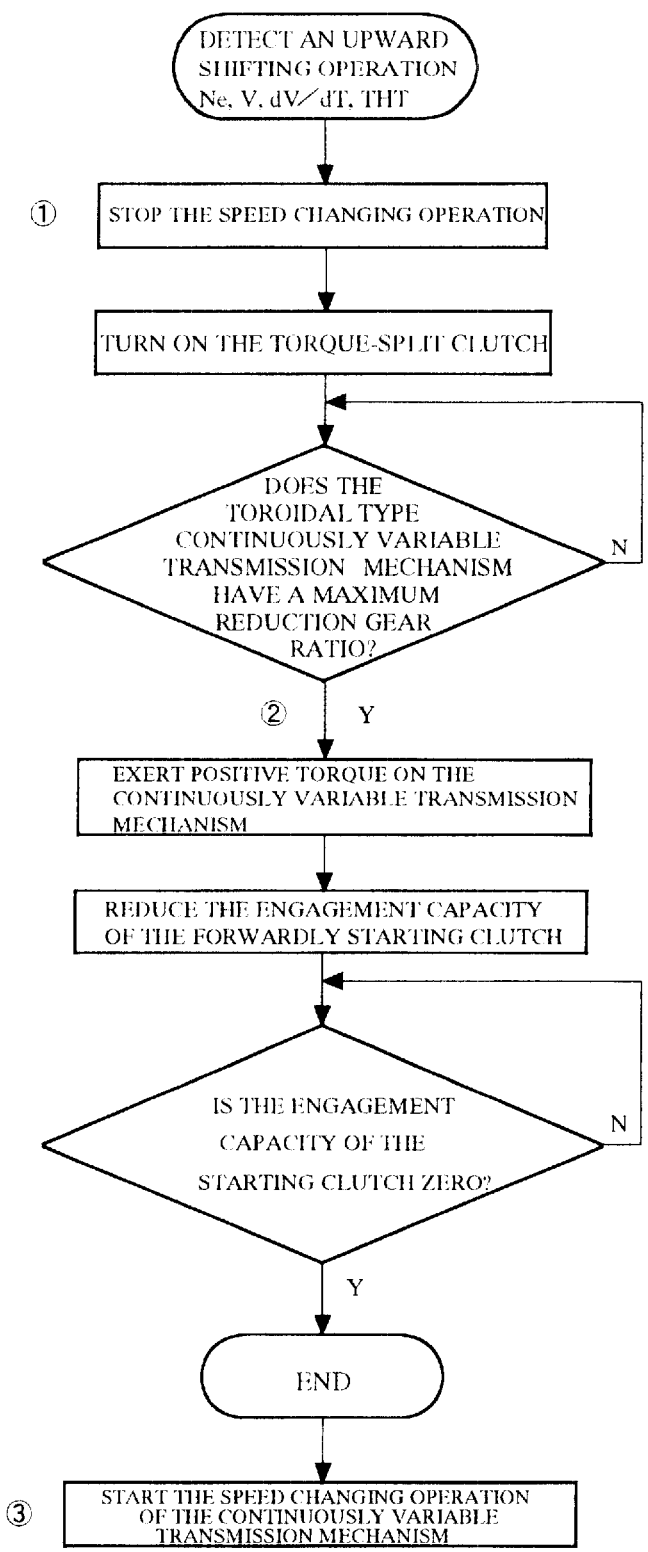
FIG. 14 is a flow chart showing an operation for controlling a transfer from a direct mode to a torque-split mode during the acceleration of an engine at a negative engine torque in the torque-split type continuously variable transmission according to the invention.

The controlling of a transfer from a direct mode to a torque-split mode in a case where a vehicle is accelerated with the engine torque in a negative condition, for example, in a case where a vehicle runs down a slope is shown in FIGS. 14 and 15. In this control operation, a speed changing operation is stopped at a point in the vicinity of a transfer point in the direct mode, and the engaging of the torque-split clutch 40 is done to set a reduction gear ratio of the transmission mechanism 10 to a minimum level. A control operation for reducing the engagement capacity of the starting clutch 46 with the torque exerted on the transmission mechanism 10 set in the positive direction is thereafter carried out. When the engagement capacity: of the starting clutch 46 reaches zero, the starting clutch 46 is disengaged, and the mode is transferred to a torque-split mode.

Second Mode of Embodiment

Figure 16:
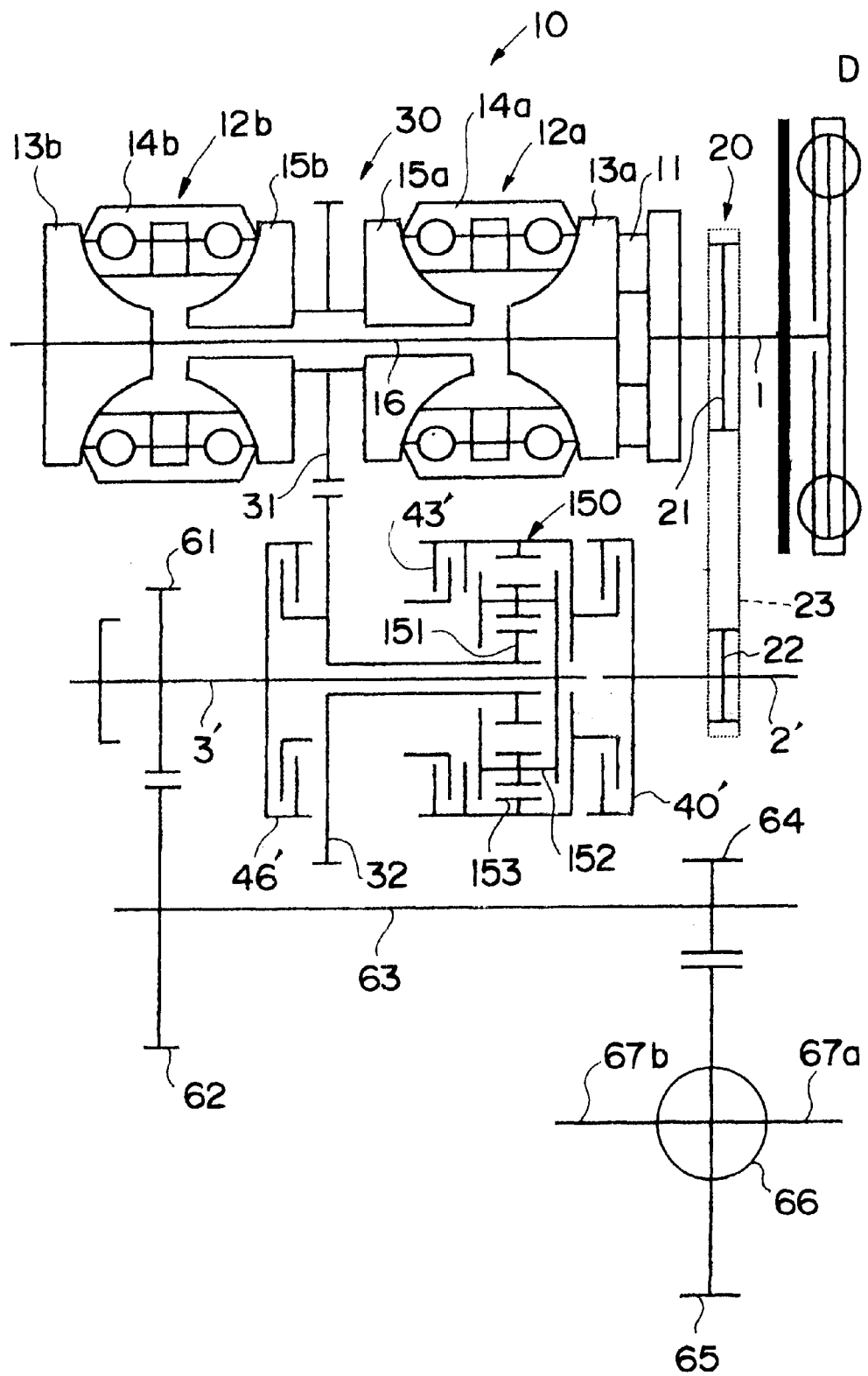
FIG. 16 is a schematic diagram showing the construction of a power transmission path of a second mode of the torque-split type continuously variable transmission according to the invention.

A second mode of the torque-split type continuously variable transmission according to the present invention will now be described with reference to FIG. 16. This continuously variable transmission has construction similar to that of the toroidal type continuously variable transmission shown in FIGS. 1 and 2, and the same structural parts will be described with the same reference numerals added thereto.

This torque-split type continuously variable transmission is provided with a transmission input shaft 1 connected to an engine output shaft via a damper:mechanism D, and a double-cavity type toroidal type continuously variable transmission mechanism 10 is mounted on the input shaft 1 coaxially therewith. The transmission mechanism 10 has the same construction as the first mode of embodiment, and includes a loading cam mechanism 11 joined to the input shaft 1, and first and second toroidal transmission units 12a, 12b arranged in a symmetrically opposed state.

The first and second toroidal transmission units 12a, 12b includes driving discs 13a, 13b, driven discs 15a, 15b, and power rollers 14a, 14b provided in spherical cavities surrounded by these driving and driven discs. The driving disc 13a is joined to the input shaft 1 via the loading cam mechanism 11, and the driving discs 13a, 13b to each other via a connecting shaft 16. Owing to the controlling of a rolling angle of the power rollers 14a, 14b in the cavities, the continuously variable changing of a speed, i.e. the continuously variable speed change controlling of the rotation of the driven discs 15a, 15b with respect to that of the driving discs 13a, 13b can be done.

A transmission counter shaft 2' extending in parallel with the input shaft 1 with a predetermined distance spaced therefrom and a transmission output shaft 3' are coaxially provided. The input shaft 1 and countershaft 2' are connected together by a first power transmission mechanism 20 which includes a driving sprocket 21, a driven sprocket 22 and a chain 23. The rotation of the input shaft 1 is transmitted at a predetermined speed change gear ratio to the countershaft 2' via the first power transmission mechanism 20.

On the output shaft 3', a planetary gear mechanism 150 is mounted coaxially therewith. This planetary gear mechanism 150 is formed of a double planetary type gear train, and having a sun gear 151, a double-pinion support carrier 152 and a ring gear 153. The sun gear 151 is engageable with and disengageable from the output shaft 3' via a starting clutch 46', and the carrier 152 is combined with the output shaft 3' in one body. The ring gear 153 can be engaged with and disengaged from the countershaft 2' via a torque split clutch 40', and fixedly held by a reversing brake 43'.

Between the two driven discs 15a, 15b of the above-mentioned transmission mechanism 10, a driving gear 31 is provided in a firmly held state, this driving gear 31 being connected to the two discs 15a, 15b. The driving gear 31 is meshed with a driven gear 32 mounted on the output shaft 3 and combined with the sun gear 151 of the planetary gear mechanism 150, and the driving gear 31 and driven gear 31 constitute a second power transmission mechanism 30.

These driving gears 31, 32 are identical with those of the first mode of embodiment. As shown in FIG. 2, the driving gear formed of one double helical gear is made by combining driving gear elements 31a, 31b made of single helical gears, the directions of distortion of which are symmetrical, by a bolt 31c, while the driven gear 32 formed of one double helical gear is made by combining driven gear elements 32a, 32b made of single helical gears, the directions of distortion of which are symmetrical, by a bolt 32c.

The rotation of the output shaft 3' is transmitted in the same manner as in the first mode of embodiment to left and right axles 67a, 67b via first to fourth output gears 61, 62, 64, 65, a secondary shaft 63 and a differential mechanism 66, and then to left and right wheels.

Regarding the torque-split type continuously variable transmission constructed as described above, a case where a vehicle in a stopped condition is started forward and made to travel will first be described. When a vehicle is in a stopped condition, an engine is usually in an idling condition, and a torque split clutch 40', a reversing brake 43' and the starting clutch 46' are disengaged. In this condition, a rotational force of the engine is transmitted to the transmission mechanism 10 via the input shaft 1 to carry out a speed changing operation in accordance with a rolling angle of the power rollers 14a, 14b, and rotate the driven discs 15a, 15b. When the vehicle is stopped with the engine in an idling condition, a reduction gear ratio of the toroidal transmission units 12a, 12b is set to a maximum level R(idling)=2.408.

In this condition, the rotational force of the engine causes the sun gear 151 of the planetary gear mechanism 150 to be rotated via the continuously variable transmission mechanism 10 and second power transmission mechanism 30, and also the countershaft 2' to be rotated via the first power transmission mechanism 20. Since the torque-split clutch 40', reversing brake 43' and starting clutch 46' are disengaged, the racing thereof occurs, and the rotational force is not transmitted to the output shaft 3'.

In order to start the vehicle in this condition, a driver steps on an accelerator to increase a rotational frequency of the engine. A control operation for engaging the starting clutch 46' is carried out in response to the above operation, and the rotational force of the engine is transmitted to the output shaft 3' via the continuously variable transmission mechanism 10, second power transmission mechanism 30 and starting clutch 46' to start the vehicle. During this time, a control operation for changing the reduction gear ratio of the transmission mechanism 10 from a maximum level to a TOP side level in accordance with the accelerator stepping operation is carried out. This prevents a contact surface pressure of the power rollers 14a, 14b and driving discs 13a, 13b and driven discs 15a, 15b from reaching an excessively high level even when the input torque increases. For example, when the vehicle is started with the accelerator fully opened, the reduction gear ratio is changed to a LOW ratio R(LOW)=1.605 at which the maximum torque of the engine can be allowed when the starting clutch 46 is engaged.

Figure 17:
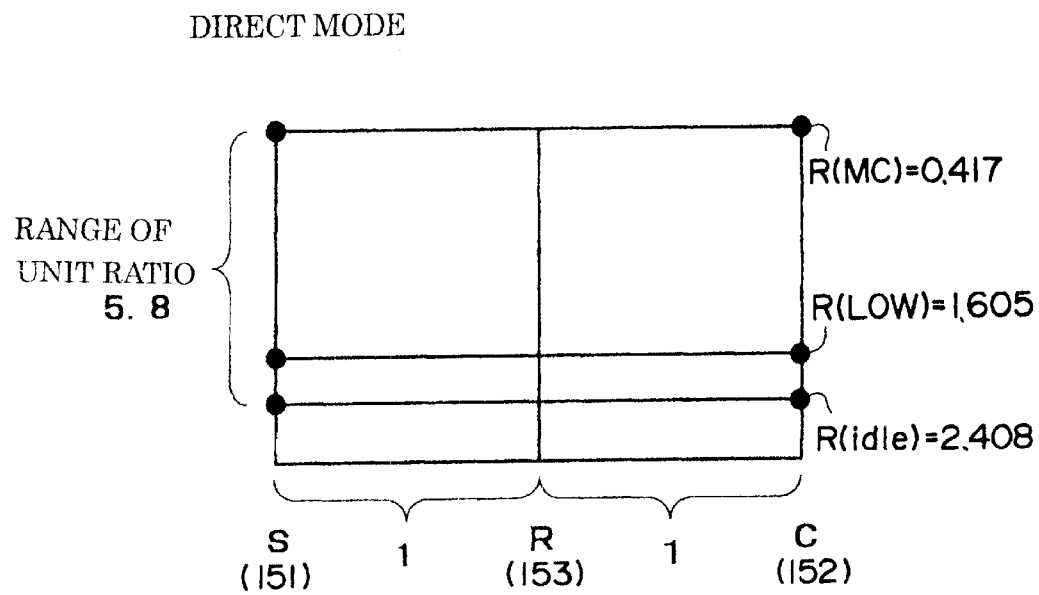
FIG. 17 is a speed diagram showing the content of a speed changing operation in a direct mode in the second mode of embodiment of the torque-split type continuously variable transmission according to the invention.

In the condition in which the starting clutch 46' is thus engaged, the sun gear 151 and carrier 152 of the planetary gear mechanism 150 are connected to the output shaft 3', and the planetary gear mechanism 150 as a whole is rotated with the output shaft 3' in a body to cause the actual mode to be turned into a direct mode. The rotational condition of the planetary gear mechanism 150 (and the output shaft 3') in this mode is shown in the speed diagram of FIG. 17. The planetary gear mechanism 150 is formed of a double planetary gear, and a number of teeth ratio of the sun gear 151 and ring gear 153 is set to 1:2. Therefore, in the speed diagram, the ring gear 153 shown by a reference letter R is in an intermediate position, and a distance between the sun gear 151 shown by a reference letter S and carrier 152 shown by a reference letter C, and that between the carrier 152 and ring gear 153 are set to 2:1 correspondingly to an inverse number of the above-mentioned number of teeth ratio.

In the direct mode, the planetary gear mechanism 150 as a whole is rotated in a body. Therefore, first, when the vehicle is stopped with the engine in an idling condition, the reduction gear ratio R(idling) of the transition mechanism 10 reaches a maximum level of 2.408, and, when the starting clutch 46 is engaged by stepping on the accelerator to a fully opened level, the reduction gear ratio is changed to R(LOW)=1.605. As the vehicle speed thereafter increases, the reduction gear ratio is changed to a minimum level. The reduction gear ratio at this point in time becomes R(MC)= 0.417, and, from this point in time, a control operation for transferring the actual mode to a torque-split mode is carried out.

The transferring of the actual mode to the torque-split mode is done by first engaging the torque-split clutch 40' with the reduction gear ratio of the transmission mechanism 10 left at R(MC)=0.417. The starting clutch 46' is then disengaged. As a result, a torque transmission path is switched, and an engine output is transmitted to the ring gear 153 of the planetary gear mechanism 150 via the first power transmission mechanism 20 and torque-split clutch 40'. Since the carrier 152 is combined with the: output shaft 3' at this time, the rotation of the carrier 152 is transmitted to wheels to drive the same, and the reaction torque is exerted on the carrier in the carrier stopping direction. The rotational torque receiving the torque exerted on the carrier 152 and ring gear 153, and working on the sun gear 151 is received by the transmission mechanism 10.

Figure 18:
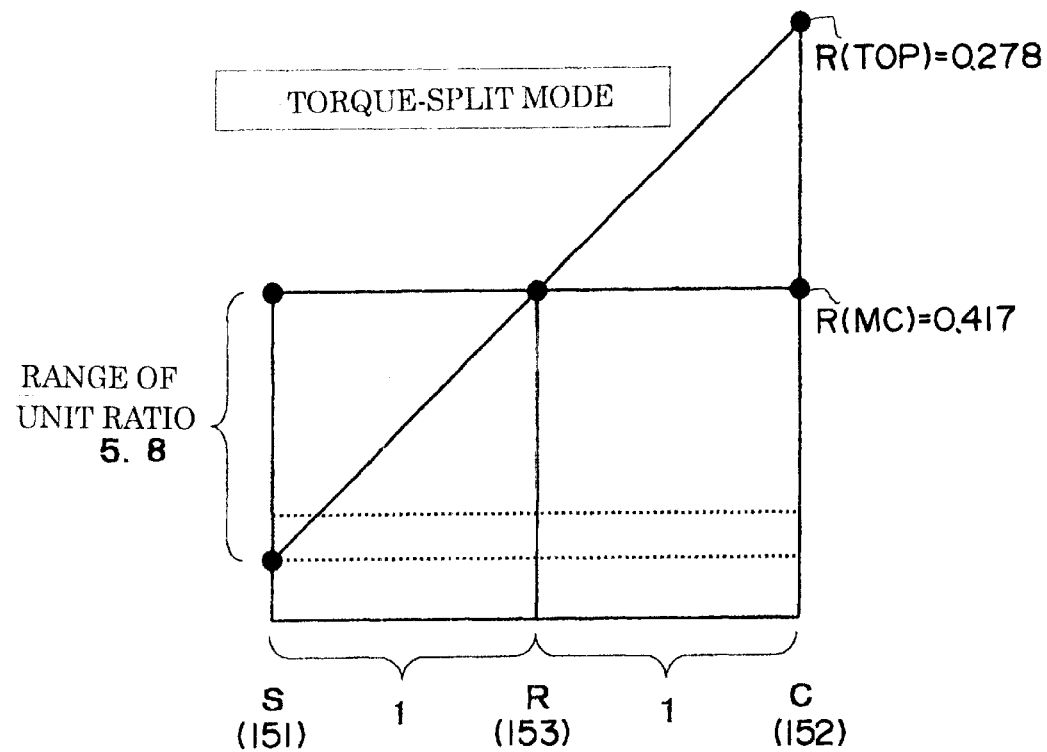
FIG. 18 is a speed diagram showing the content of a speed changing operation in a torque-split mode in the second mode of embodiment of the torque-split type continuously variable transmission according to the invention.

Therefore, when, conversely, a control operation for increasing the reduction gear ratio of the transmission mechanism 10 from the minimum level of 0.417 with a rotational frequency of the engine assumed to be constant, the rotational frequency of the sun gear 151 decreases with the rotational frequency of the ring gear 153 kept constant, and the rotational frequency of the carrier 152 increases. When the reduction gear ratio of the transmission mechanism 10 is changed to a maximum level of 2.408, a reduction gear ratio of the portion which is from the input shaft 1 to the output shaft 3' is changed from R(MC)=0.417 to R(TOP)=0.278 as shown in FIG. 18.

A case where the vehicle travels reversely will now be described. In this case, the reversing brake 43' is engaged to set a reversing mode (Rev mode). When the reversing brake 43' is engaged, the ring gear 153 of the planetary gear mechanism 150 is fixedly held. At this time, the rotation of the engine is transmitted from the transmission mechanism 10 to the sun gear 151 via the second power transmission mechanism 30 to rotate the suns gear 151, so that the carrier 152 is rotated in the reverse direction. At this time, the reduction gear ratio becomes 1/2 correspondingly to the number of teeth ratio of the sun gear 151 to the ring gear 153.

Figure 19:
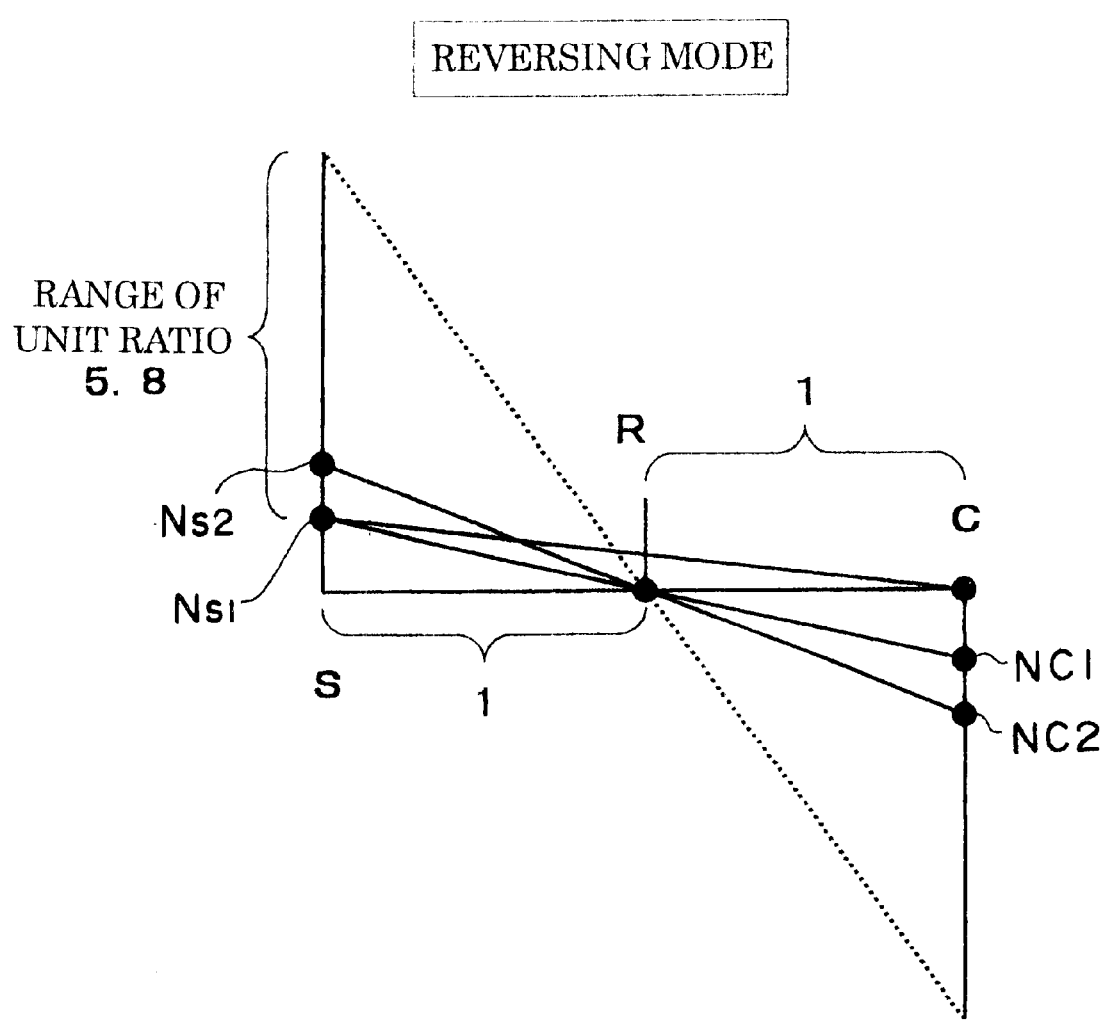
FIG. 19 is a speed diagram showing the content of a speed changing operation in a reversing mode in the second mode of embodiment of the torque-split type continuously variable transmission according to the invention.

This condition is shown in FIG. 19. At an engine idling time, the reduction gear ratio of the transmission mechanism 10 is set to a maximum level of 2.408, and the sun gear 151 and carrier 152 are put in the rotating condition shown by reference symbols NS1 and NC1 respectively. When the accelerator is stepped on, the rotational frequency of the engine increases, and the reduction gear ratio is changed in accordance with this increase in the rotational frequency to a forward side LOW ratio R(LOW)=1.605 in the same manner as in the case where the vehicle travels forward. Consequently, the sun gear 151 and carrier 152 (and output shaft 3) are put in a rotating condition shown by reference symbols NS2, NC2 respectively. When the vehicle travels backward, a speed control operation is carried out until the reduction gear ratio reaches R(LOW)=1.605, and a control operation for further reducing the reduction gear ratio is not carried out.

As described above, the torque-split type continuously variable transmission according to the invention is formed so that an output from the double-cavity type toroidal continuously variable transmission mechanism is transmitted from the driving gear, which is held firmly between a pair of discs provided in an adjacent-side-opposed state in an axially intermediate portion of the continuously variable transmission mechanism, to the sun gear member via the driven gear meshed with the driving gear. Therefore, the continuously variable transmission as a whole can be formed simply and compactly in spite of the use of the continuously variable transmission mechanism. Especially, the forming of the transmission as a whole to smaller dimensions or compactly can be attained by providing a planetary gear mechanism between the first and second power transmission mechanisms, i.e., by effectively utilizing an inner space of the transmission.

The torque-split type continuously variable transmission according to the invention can be formed by using a double-pinion type planetary gear mechanism instead of the single pinion type planetary gear mechanism in the above-mentioned structure. In such a case, the transmission is formed by providing a torque-split clutch device capable of engaging and disengaging the ring gear member of the double-pinion type planetary gear mechanism and a countershaft with and from each other, a reversing brake device capable of fixedly holding the ring gear, and a starting clutch device capable of engaging and disengaging a sun gear member of the planetary gear mechanism and an output shaft with and from each other, and a carrier member of the planetary gear mechanism is combined with the output shaft.

The torque-split type continuously variable transmission of the above-described construction is preferably formed as follows. The driving and driven gears constituting a second power transmission mechanism are formed by combining together two single helical gears the directions of distortion of which are symmetrical. Owing to a thrust which the driving and driven gears meshed with each other receive, the two single helical gears constituting the driving gear are pressed toward driven discs, and two single helical gears constituting the driven gear are pressed in the direction in which these helical gears are combined with each other.

Owing to this structure, the thrust exerted on the driving gear held firmly between the two driven discs resists this driving gear holding force, and also works on the driven gear so as to press these two gears against each other. As a result, a smooth transmitting of rotation can be effected by the second power transmission mechanism using double helical gears. Moreover, the thrust exerted on the driving gear can be offset by the driving gear holding force of the driven discs, and the thrust exerted on the driven gear can be set so as to combine together the left and right helical gears constituting the driven gear. This can prevent the thrust exerted on the driving and driven gears from working on the bolt by which the two single helical gears are combined with each other, and the gear combining force of the bolt from decreasing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2000-085742 filed on Mar. 27, 2000, which is incorporated herein by reference.

What is claimed is:

1. A torque-split type continuously variable transmission having an input shaft connected to a driving power source, a toroidal type continuously variable transmission mechanism mounted on and connected coaxially to the input shaft, a countershaft extending in parallel with the input shaft and coaxially with an output shaft, a planetary gear mechanism mounted on the output shaft coaxially therewith, a first power transmission mechanism for carrying out the transmission or rotational power between the input shaft and countershaft, and a second power transmission mechanism for carrying out the transmission of rotational power between an output member of the continuously variable transmission mechanism and the planetary gear mechanism, comprising:

a torque split clutch device capable of engaging and disengaging a first member of the planetary gear mechanism and countershaft with and from each other, a reversing brake device capable of firmly holding the first member, and a starting clutch device capable of engaging and disengaging a second member of the planetary gear mechanism and output shaft with and from each other, the toroidal type continuously variable transmission mechanism being formed of a double-cavity type toroidal continuously variable transmission mechanism in which a pair of driven discs are provided in an adjacent-side-opposed state at an axially intermediate portion thereof, a driving gear held firmly between and joined to the two driven discs and a driven gear meshed with the driving gear and joined to the second member constituting the second power transmission mechanism, and a third member of the planetary gear mechanism being connected to the output shaft.

2. A torque-split type continuously variable transmission according to claim 1, wherein the continuously variable transmission mechanism is formed of a loading cam mechanism joined to the input shaft, and first and second toroidal transmission units arranged in a symmetrically opposed state, the first and second transmission units being formed of driving discs, the driven discs, and power rollers provided in a spherical cavity surrounded by the driving and driven discs respectively, the driving discs which form the first transmission unit being joined to the input shaft via the loading cam mechanism, the driving discs which form the first transmission unit and the driven discs which form the second transmission unit being combined with each other via a connecting shaft.

3. A torque-split type continuously variable transmission according to claim 1 or 2, wherein the driving and driven gears constituting the second power transmission mechanism are formed by combining together two single helical gears the directions of distortion of which are symmetrical, the two single helical gears which form the driving gear being held between and pressed by the two driven discs, the two single helical gears which form the driven gear being pressed in the direction in which the helical gears are combined with each other owing to a thrust which the driven gear meshed with the driving gear receives.

4. A torque-split type continuously variable transmission according to claim 1, wherein the first power transmission mechanism is formed of a driving sprocket fixedly mounted on the input shaft, a driven sprocket fixedly mounted on the countershaft, and a chain passed around the two sprockets.

5. A torque-split type continuously variable transmission according to claim 1, wherein the planetary gear mechanism is of single-pinion type, and the first member, the second member and the third member respectively comprise a carrier member, a sun gear member and a ring gear member of the single-pinion type planetary gear mechanism.

6. A torque-split type continuously variable transmission according to claim 1, wherein the planetary gear mechanism is of double-pinion type, and the first member, the second member and the third member respectively comprise a ring gear member, a sun gear member and a carrier member of the double-pinion type planetary gear mechanism.

* * * * *